May 6, 1941.                R. WILKE                2,240,598
                          ELECTRIC DRILL
                       Filed Oct. 7, 1939         2 Sheets-Sheet 1

WITNESSES:                                        INVENTOR
Edward Michaels                               *Richard Wilke.*
Wm. J. Ruano                                        BY
                                              Paul E. Friedeman
                                                 ATTORNEY May 6, 1941.  R. WILKE  2,240,598
ELECTRIC DRILL
Filed Oct. 7, 1939  2 Sheets-Sheet 2
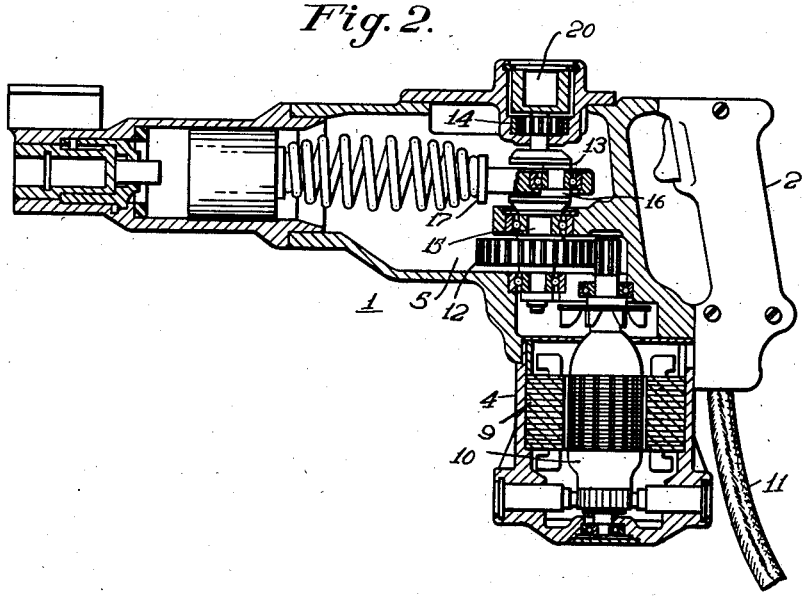
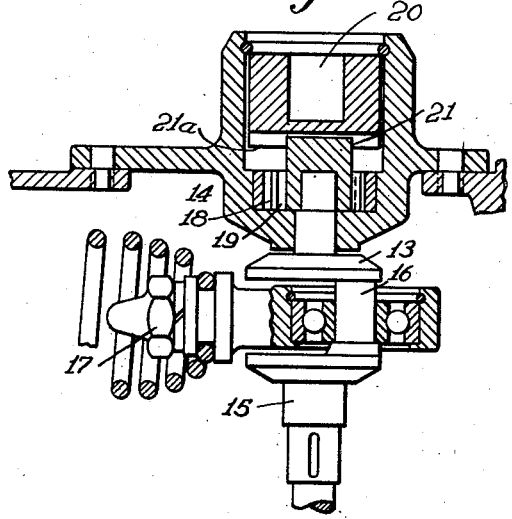
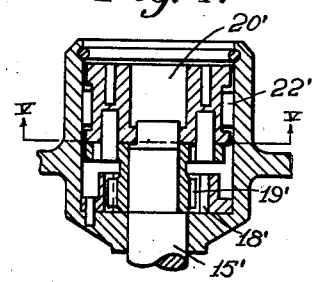
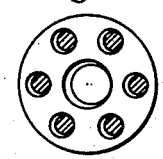
WITNESSES:
Edward Michaels
Wm. J. Ruano
INVENTOR
Richard Wilke.
BY
Paul E. Friedemann
ATTORNEY Patented May 6, 1941

2,240,598

UNITED STATES PATENT OFFICE 2,240,598

ELECTRIC DRILL

Richard Wilke, Berlin-Charlottenburg, Germany, assignor to Westinghouse Electric & Manufacturing Company, East Pittsburgh, Pa., a corporation of Pennsylvania Application October 7, 1939, Serial No. 298,452
In Germany January 31, 1939

6 Claims. (Cl. 255—42)

My invention relates to an electric hand drill and is more specifically directed to the provision of a tool displacing mechanism for effecting slow rotary movement of the drill which is operated under the power of the electric motor.

In well-known types of drills, the displacement of the drill head or drill for preventing the fixing of the drill in the material being drilled, is done by hand. In other words, during the drilling, a casing enclosing the drill is moved backward and forward by hand which prevents the fixing of the drill in the material and intermittently, partially rotates the drill into a new operating position. In compressed air tools, or in hydraulic drilling apparatus, it has already been proposed to carry out the displacement mechanically by coupling the displacement mechanism with the drive for the apparatus. In electric drills, however, the mechanical coupling of the displacement mechanism with the drive for the tool has heretofore been avoided, since the driving motor usually has too large a rotational speed. For this reason, the displacement mechanism in electric drills has continued to be actuable by hand.

In accordance with my invention, a mechanical displacement for electric drills is made possible by connecting the displacement mechanism to the driving motor of the tool preferably through a planetary gear drive. The planetary gear drive is preferably driven by a crank shaft which actuates the impacting mechanism for the drill, and is connected to the displacement mechanism through a shaft. In this manner, it is possible, even when using a high speed driving motor, to reduce this speed to such an extent as to make it practicable for effecting the small displacement or rotation necessary for avoiding fixing of a drill tool to the work piece in a reciprocating electric drill.

Other objects and advantages will become more apparent from a study of the following specification when considered in conjunction with the accompanying drawings, in which:

Fig. 2 is a cross sectional view of the drill shown in Figure 1;

Fig. 3 is an enlarged sectional view showing a portion of the drive illustrated in Figure 2;

Fig. 4 shows a modified form of drive; and

Fig. 5 is a sectional view taken along line V—V of Fig. 4.

Figure 1:
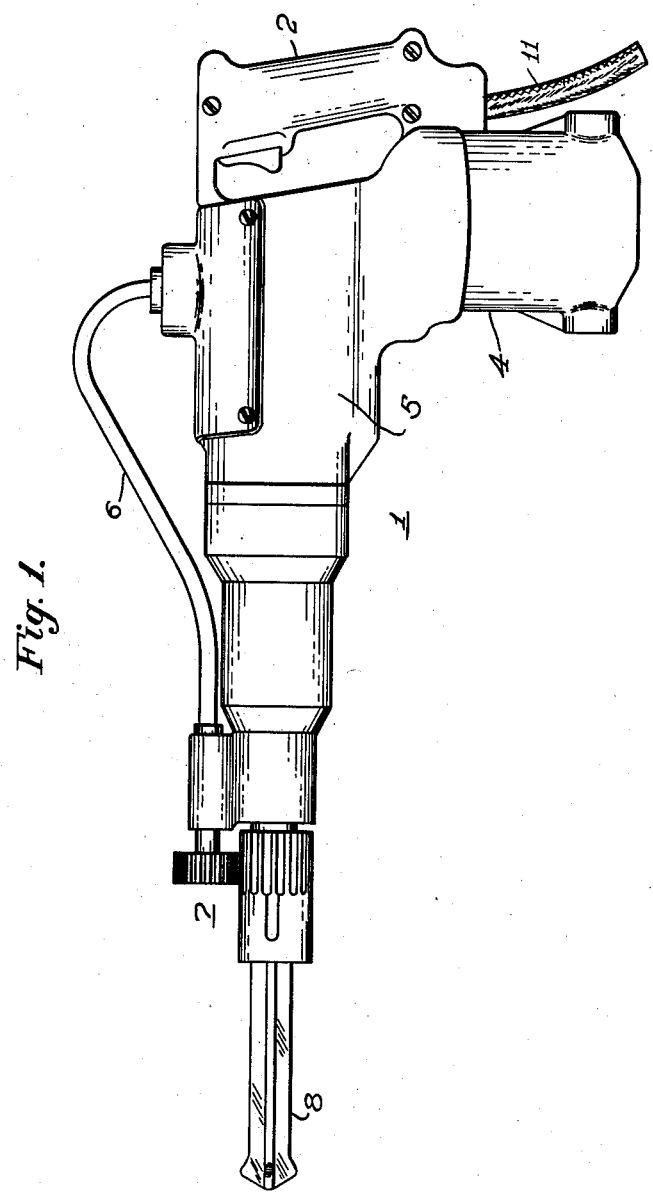
Figure 1 is a view in side elevation of an electric hand drill embodying the principles of my invention.

Referring more particularly to Figures 1, 2 and 3, the electric drill 1 is constructed in the form of a pistol. The handle 2 is integrally secured to the handle or grip portion 4 of the motor housing. In the central chamber portion 5 of the pistol shaped housing, the drive is located. Element 6 is a flexible shaft which connects the motor portion of the drive portion to the displacement gear mechanism 7 which displaces the drill 8, rotating it slowly and in steps.

As can be seen from Fig. 2, the stator 9 and the rotor 10 of the motor driving the apparatus is located in the handle portion 4 of the housing. The current connecting conductor is indicated at 11. The shaft of the motor 10 drives the gear 12 of the drive which is arranged eccentric to the motor axis. A crank shaft 13 is connected to the gear 12 and it engages the planetary gear drive 14. While the motor rotates at a speed of, for example, 8000 to 10,000 revolutions, the gear 12 revolves at only 1200 revolutions. By the operation of the planetary drive 14, the rotational speed may be reduced to 80 revolutions per minute, for example. At the displacement gear mechanism 7, another transformation is provided so that the drill tool 8 has only 40 revolutions per minute.

An amplified showing of the parts containing the planetary drive is contained in Figure 3. The shaft 15 which is coupled to the gear 12 drives the planetary drive 14 through the crank shaft 13. The crank pin 16 serves for driving the impacting mechanism 17. The fixed element of the planetary gear is identified by numeral 18 and the rotating planetary gear element is identified by numeral 19. The carrier 20 for the flexible shaft is connected with the rotating planetary gear element 19 through a slidable key coupling 21 so as to permit sliding movement of 21 in slot 21a as gear 19 moves around its orbit.

In Figure 4, a modified form of crank coupling is shown, the details of the eccentric drive which are apparent from Figure 5 which is a sectional view taken along line V—V of Fig. 4. At 22, a needle bearing is indicated. The parts corresponding to those in Fig. 3 are primed, for example, element 18' of Fig. 4 corresponds to element 18 of Fig. 3, etc.

I am, of course, aware that others, particularly after having had the benefit of the teachings of my invention, may devise other devices embodying my invention, and I, therefore, do not wish to be limited to the specific showings made in the drawings and the descriptive disclosures hereinbefore made, but wish to be limited only by the scope of the appended claims and such prior art that may be pertinent.

I claim as my invention:

1. An electric hand drill comprising, in combination an electric motor, gear reducing means driven thereby, a crank shaft driven by said gear reducing means, a drilling tool which is reciprocated by said crank shaft and a second gear reducing means including a planetary gear drive including an eccentric coupling connection, which gear drive is driven by an end shaft of said crank shaft, a tool displacing means which is geared to said second gear reducing means through said eccentric coupling connection and which is effective to impart a slow rotary movement to said drilling tool as it is being reciprocated.

2. An electric hand drill having a casing shaped in the form of a pistol comprising essentially a grip or handle portion, a central chamber portion and a barrel portion, an electric motor situated in the grip or handle portion of said casing, reciprocating means driven by said motor and located in the chamber portion of said pistol casing, a drilling tool driven by said reciprocating means and located in the barrel portion of said pistol casing, and a tool displacing means including a planetary gear drive which includes an eccentric coupling for effecting rotary displacement of said drilling tool while it is being reciprocated, said coupling comprising a cranklike element and an element which is slidably engaged therewith for transmitting rotational motion.

3. An electric hand drill having a casing shaped in the form of a pistol comprising essentially a grip or handle portion, a central chamber portion and a barrel portion, an electric motor situated in the grip or handle portion of said casing, a crank shaft driven by said motor and located in the chamber portion of said pistol casing, a drilling tool driven by said crank shaft and located in the barrel portion of said pistol casing, and a tool displacing means situated in said chamber portion of the casing and which is readily disconnectable exteriorally of said casing for effecting rotary displacement of said drilling tool while it is being reciprocated.

4. An electric hand drill having a casing shaped in the form of a pistol comprising essentially a grip or handle portion, a central chamber portion and a barrel portion, an electric motor situated in the grip or handle portion of said casing, a crank shaft driven by said motor and located in said chamber portion, a drilling tool driven by said crank shaft and located in said barrel portion, a planetary gear reducing means also located in said chamber portion and driven by said electric motor, gear means including a flexible coupling which is driven by said planetary gear reducing means and which in turn rotates said drilling tool as it is being reciprocated.

5. An electric hand drill having a casing shaped in the form of a pistol comprising essentially a grip or handle portion, a central chamber portion and a barrel portion, an electric motor situated in the grip or handle portion of said casing, a crank shaft driven by said motor and located in said chamber portion, a drilling tool driven by said crank shaft and located in said barrel portion, a planetary gear reducing means also located in said chamber portion and driven by said electric motor, a flexible coupling driven by said planetary gear reducing means and which emerges from the chamber portion of said casing and is coextensive with said barrel portion, a pair of coacting gears, one on said barrel portion and the other at the barrel end of said flexible coupling for rotating said drilling tool as it is being reciprocated by said crank shaft.

6. An electric hand drill having a casing shaped in the form of a pistol comprising essentially a grip or handle portion, a central chamber portion and a barrel portion, an electric motor situated in the grip or handle portion of said casing, reciprocating means driven by said motor and located in the chamber portion of said pistol casing, a drilling tool driven by said reciprocating means and located in the barrel portion of said pistol casing, and a tool displacing means including a planetary gear drive which includes an eccentric coupling for effecting rotary displacement of said drilling tool while it is being reciprocated, said coupling comprising a cranklike element including a disc having a plurality of holes and an element having a plurality of pins each of which fits into one of said holes but which is smaller in diameter than its corresponding hole for transmitting rotational motion.

RICHARD WILKE.